(12) United States Patent
Nelson et al.

(10) Patent No.: US 6,185,792 B1
(45) Date of Patent: Feb. 13, 2001

(54) BI-DIRECTIONAL SELF-LOCKING CABLE TIE

(75) Inventors: Andrew Nelson, Memphis, TN (US); Peter M. Wells, Jr., Reeds Spring, MO (US)

(73) Assignee: Thomas & Betts International, Inc., Sparks, NV (US)

(*) Notice: Under 35 U.S.C. 154(b), the term of this patent shall be extended for 0 days.

(21) Appl. No.: 09/197,831

(22) Filed: Nov. 20, 1998

Related U.S. Application Data

(60) Provisional application No. 60/066,123, filed on Nov. 21, 1997, and provisional application No. 60/077,514, filed on Mar. 11, 1998.

(51) Int. Cl.⁷ .................................................. B65D 63/00
(52) U.S. Cl. .................. 24/16 PB; 24/17 AP; 24/30.5 P
(58) Field of Search .............................. 24/16 PB, 17 AP, 24/30.5 P, 17 A; 248/74.3

(56) References Cited

U.S. PATENT DOCUMENTS

| | | |
|---|---|---|
| 3,102,311 | 9/1963 | Martin et al. . |
| 3,103,666 | 9/1963 | Bone . |
| 3,457,598 | 7/1969 | Mariani . |
| 3,537,146 | 11/1970 | Caveney . |
| 3,588,962 * | 6/1971 | Feldberg ............................ 24/16 PB |
| 3,735,448 * | 5/1973 | Waddington ....................... 24/16 PB |
| 3,949,449 * | 4/1976 | Caveney et al. ................... 24/16 PB |
| 3,952,373 * | 4/1976 | Noorily ............................... 24/16 PB |
| 3,965,538 * | 6/1976 | Caveney et al. ................... 24/16 PB |
| 3,967,345 | 7/1976 | Sumimoto . |
| 4,245,374 * | 1/1981 | Suzuki ................................ 24/16 PB |
| 4,417,656 | 11/1983 | Kato . |
| 4,456,123 | 6/1984 | Russell . |
| 4,631,782 | 12/1986 | Gecs . |
| 4,640,319 | 2/1987 | Walker . |
| 4,640,320 | 2/1987 | Avison et al. . |
| 4,683,920 | 8/1987 | Furutsu . |
| 4,688,302 * | 8/1987 | Caveney et al. ................... 24/16 PB |
| 4,712,677 | 12/1987 | Russell . |
| 5,042,535 | 8/1991 | Schlottke . |
| 5,146,654 * | 9/1992 | Caveney et al. ................... 24/16 PB |
| 5,317,787 * | 6/1994 | Fortsch .............................. 24/16 PB |
| 5,884,367 | 3/1999 | Teagno et al. . |

FOREIGN PATENT DOCUMENTS

| | | |
|---|---|---|
| 2139091 | 3/1972 | (DE) . |
| 0 469 908 | 2/1992 | (EP) . |
| 0 611 038 | 8/1994 | (EP) . |
| 2 082 115 | 12/1971 | (FR) . |
| 2 089 514 | 1/1972 | (FR) . |
| 2 302 435 | 9/1976 | (FR) . |
| 1383912 | 2/1975 | (GB) . |
| WO 89/06328 | 7/1989 | (WO) . |

\* cited by examiner

*Primary Examiner*—Victor N. Sakran
(74) *Attorney, Agent, or Firm*—Hoffmann & Baron, LLP

(57) ABSTRACT

A one-piece bi-directional cable tie for bundling articles having a tail at one end, a locking head at the other end and an elongate strap body therebetween may feature one or more fixed locking teeth opposite a deflectable locking pawl so as to provide ratcheting locking engagement with the two major surfaces of its strap body. The fixed teeth may provide symmetrical performance characteristics or may provide selectable performance characteristics depending on the direction of strap body insertion through the locking head. The locking head may facilitate wedging the strap body against the deflectable pawl. The deflectable pawl may include a chevron-shaped upper surface so as to provide an undercut surface for improved engagement with the locking teeth of the strap body.

10 Claims, 10 Drawing Sheets

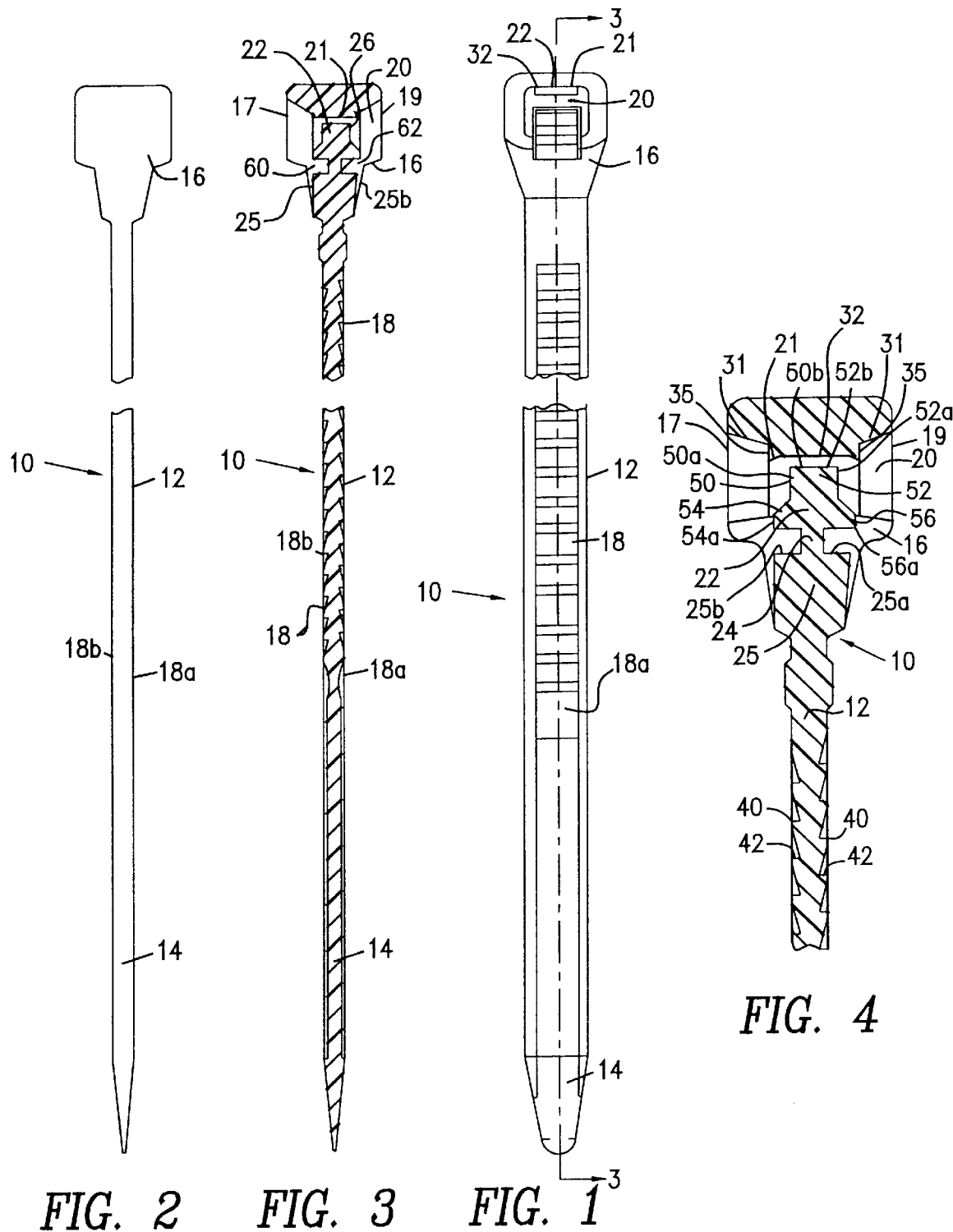

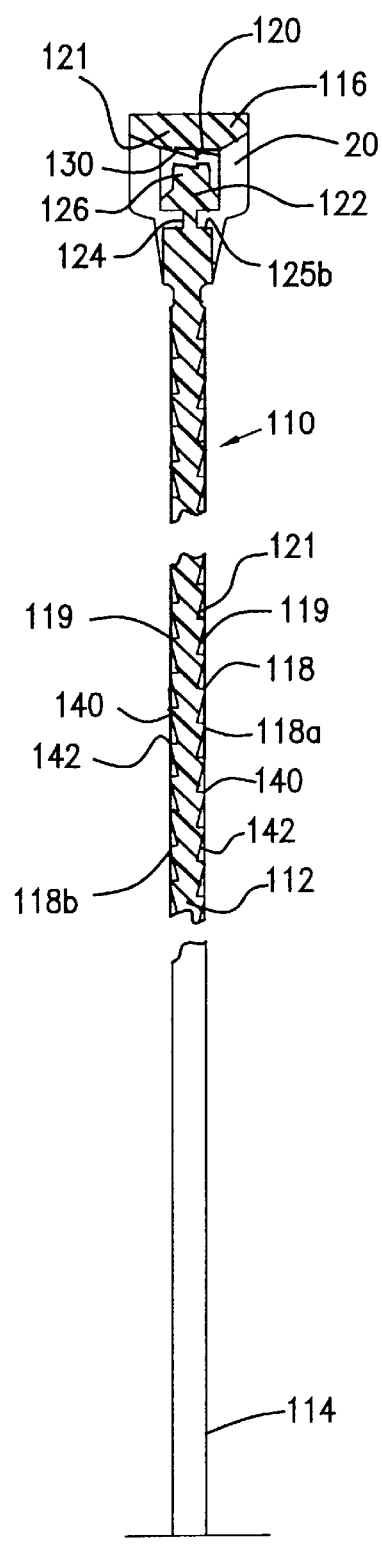
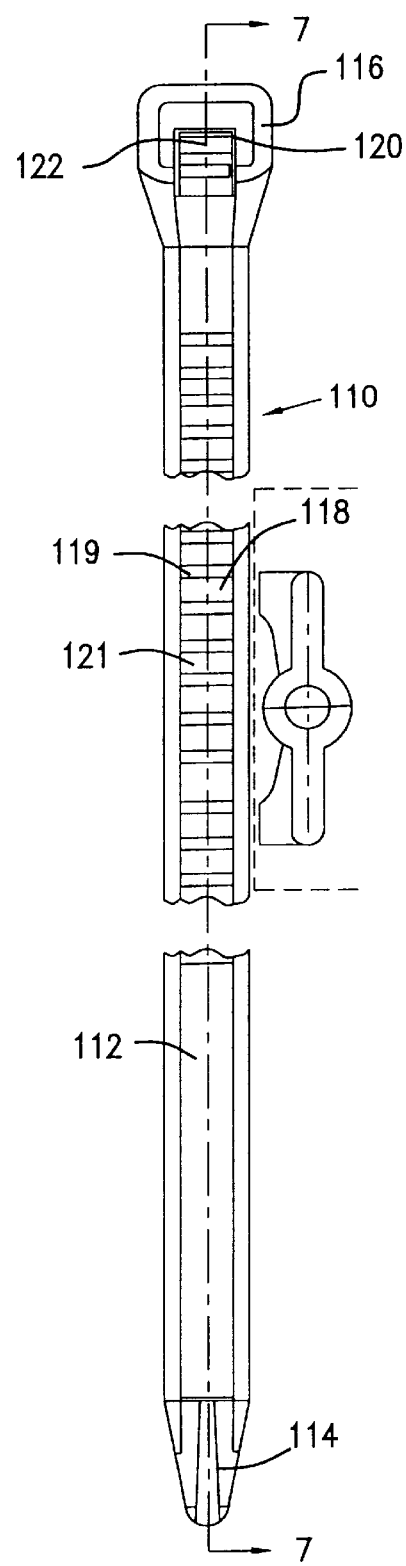
FIG. 7
FIG. 6

BI-DIRECTIONAL SELF-LOCKING CABLE TIE

CROSS-REFERENCE TO RELATED APPLICATIONS

The present application claims priority to U.S. Provisional Patent Application Ser. No. 60/066,123, filed Nov. 21, 1997 and to U.S. Provisional Patent Application Ser. No. 60/077,514, filed Mar. 11, 1998.

FIELD OF THE INVENTION

The present invention relates generally to a self-locking cable tie for securing a plurality of wires or similar articles. More particularly, the present invention relates to a bi-directional cable tie which allows strap insertion though the head in either direction.

BACKGROUND OF THE INVENTION

The use of cable ties to bundle a plurality of wires or similar articles has long been known. Basic cable tie construction includes an elongate cable tie strap having a tail at one end and a head at the other end. The head includes a central passage or aperture therethrough for accommodating a tail in an insertable fashion. The head supports a locking device adjacent the head aperture to securely lock the cable tie body within the aperture of the head to provide securement of the cable tie about the bundle of wires. In one type of cable tie construction, the locking device is a flexibly supported integrally formed pawl having plastic teeth which engage corresponding teeth on a cable tie body to provide locking engagement therebetween. As is typical of most cable ties, the tail of the cable tie is inserted into the head aperture uniquely in one direction. However, the art has also seen the use of bi-directional, or symmetrically-formed, cable ties which permit the cable tie tail to be inserted through the aperture in the head in either direction.

One such bi-directional cable tie is shown and described in co-pending commonly assigned U.S. application Ser. No. 08/689,466, filed Aug. 9, 1996, entitled "A Self-Locking Cable Tie Strap With Symmetrical Structure", issued on Mar. 23,1999, as U.S. Pat. No. 5,884,367 which is herein incorporated by reference for all purposes. The cable tie of such construction may be particularly used with an automatic cable tie installing device where a plurality of cable ties held together in a reel. A cable tie from the reel may be fed from a dispenser to a cable tie installing gun for installation about a plurality of wires. The symmetrical construction of the cable tie permits the cable tie to be easily dispensed and aligned within the installation gun. As may be appreciated, in order to accommodate insertion of the cable tie tail from either direction, the pawl or locking device of the symmetrical cable tie must be sufficiently flexible to permit deflection in either direction. Such flexibility assures that the cable tie tail may be easily inserted through the aperture in the head in either direction.

While such flexible construction permits easy insertion, it has been found that in certain circumstances such cable ties may not exhibit sufficiently high resistance to withdrawal forces as may be required in certain applications. Additionally, the art has uniformly provided bi-directional cable ties having symmetrical withdrawal-resistance characteristics while ignoring circumstances where it may be desirable to provide a bi-directional cable tie exhibiting discretely selectable, or non-symmetrical, withdrawal-resistance characteristics depending upon which direction the cable tie strap is inserted through the head.

Accordingly, it is desirable to provide a cable tie having a self-locking feature in a symmetrical structure which exhibits ease of insertion of the cable tie strap into the aperture in either direction and yet provides suitably high resistance to withdrawal forces in order to maintain a self-locking configuration. Additionally, it is desirable to provide a self-locking feature in an asymmetrical structure which offers discretely-selectable resistance to withdrawal forces according to the direction of strap insertion.

SUMMARY OF THE INVENTION

It is an object of the invention to provide a bi-directional cable tie for bundling one or more articles.

It is another object of the invention to provide a bi-directional cable tie having improved performance characteristics.

It is still another object of the invention to provide a bi-directional cable tie having a fixed locking teeth capable of engaging the teeth on the other side of the strap body as those engaging the locking pawl.

It is yet another object of the present invention to provide a bi-directional cable tie providing asymmetric performance characteristics in that the hoop strength depends on the direction through which the strap body is inserted into the passageway.

It is even yet another object of the present invention to provide a bi-directional cable tie with the locking teeth of the locking pawl include an undercut strap engaging surface so as to increase the range of pawl deflection providing locking engagement between the pawl and the strap body.

In the efficient attainment of these and still other objects, the present invention provides a bi-directional cable tie for bundling one or more articles having a locking head at one end, a tail at the other end and an elongate strap body therebetween. The strap body includes opposing first and second major surfaces having a plurality of locking teeth formed on each major surface. The locking head includes a first opening, a second opening, and an elongate strap passageway extending therebetween in a direction substantially perpendicular to the strap body. The head also provides opposed shoulder and block surfaces extending along the passageway. The shoulder surface provides a first rotation stop surface adjacent the first opening and a second rotation stop surface adjacent the second opening. A deflectable locking pawl extends from the shoulder surface into the passageway across from the block surface. The locking pawl is substantially aligned with the strap body and is deflectable by the strap body upon insertion of the strap body in either direction through the passageway. The locking pawl also provides locking engagement with the strap body upon attempted withdrawal of the strap body in a direction opposite to the insertion direction. The locking pawl includes a locking portion having a first locking tooth facing both the first opening and the passageway and a second locking tooth facing both the second opening and the passageway, and an elongate pawl base including a first cantilever arm having a first free end extending towards the first opening and a second cantilever arm having a second free end extending towards the second opening. The pawl base is connected to the shoulder by a flexible hinge which defines the closed end of both a first notch bounded by the first cantilever arm and the first stop surface and opening towards the first opening of the head, and a second notch bounded by the second cantilever arm and the second stop surface and opening towards the second opening of the head. When the strap body is inserted through one end of the passageway it contacts the near locking tooth of the locking pawl and causes the locking pawl to translate and rotate about the flexible hinge towards the opposite end of the passageway so that the free end of the oppositely-extending cantilever arm engages its opposing rotation stop so as to close the notch opening towards the exit end of the passageway. Attempted withdrawal of the strap body back through the passageway causes the contacted locking tooth of the pawl to engage a locking tooth of the strap body and counter-rotate the locking pawl about the hinge to thereby force the strap body against the block surface of the head; and The present invention also contemplates increasing the hoop strength of the cable tie of the present invention by providing one or more fixed locking teeth on the block surface of the cable tie head for engaging the locking teeth on the opposite surface of the strap as those engaging the deflectable pawl. In one embodiment of the present invention a fixed locking tooth is provided adjacent each opening so as to engage the strap upon withdrawal back through the adjacent opening. The fixed locking teeth are symmetrically provided so as to offer substantially the same performance characteristic regardless of the insertion direction of the strap body through the passageway in the head.

In another embodiment of the present invention a fixed locking tooth is provided to effectively resist withdrawal through in only one direction. This asymmetric bi-directional cable tie therefore offers a discretely-selectable performance characteristics depending upon the direction in which the strap body is inserted through the passageway. That is, the hoop strength will be higher when the strap body is inserted into the passageway in the direction that provides locking engagement between the fixed tooth and the strap body than when inserted through the passageway in the other direction.

In yet another embodiment of present invention the first and second rotation stop surfaces of the shoulder are formed having a pronounced taper so as to face both the adjacent opening in the cable tie head and the passageway. The tapered stop surfaces provide a wedge surface enabling the opposed cantilever arm to slide towards the hinge to thereby further pin the strap body against the block surface of the head.

In even still another embodiment of the present invention, the locking pawl provides a chevron-shaped upper surface in facing opposition to the block surface so that the first and second locking teeth of the pawl provide improved locking engagement with the teeth of the strap body. The chevron-shaped upper surface is desirably formed by the side-by-side formation of a pair of locking teeth having a first surface facing the closest opening in the head and a second surface facing both the passageway and the other opening of the head.

The present invention will be more readily appreciated in a reading of the "Detailed Description of the Invention" with reference to the drawings.

BRIEF DESCRIPTION OF THE DRAWINGS

FIG. 1 shows a top elevational view of a cable tie of the present invention.

FIG. 2 shows a side elevational view of the cable tie of FIG. 1.

FIG. 3 shows a longitudinal cross-sectional view of the cable tie of FIG. 1 taken through the line 3—3.

FIG. 4 is a cross-sectional view detailing the deflectable pawl of the cable tie of FIG. 1.

FIG. 6 is a top elevational view of an alternate embodiment of the cable tie of the present invention.

FIG. 7 is a longitudinal cross-sectional view of the cable tie of FIG. 6.

DETAILED DESCRIPTION OF THE PREFERRED EMBODIMENT

Figure 5:
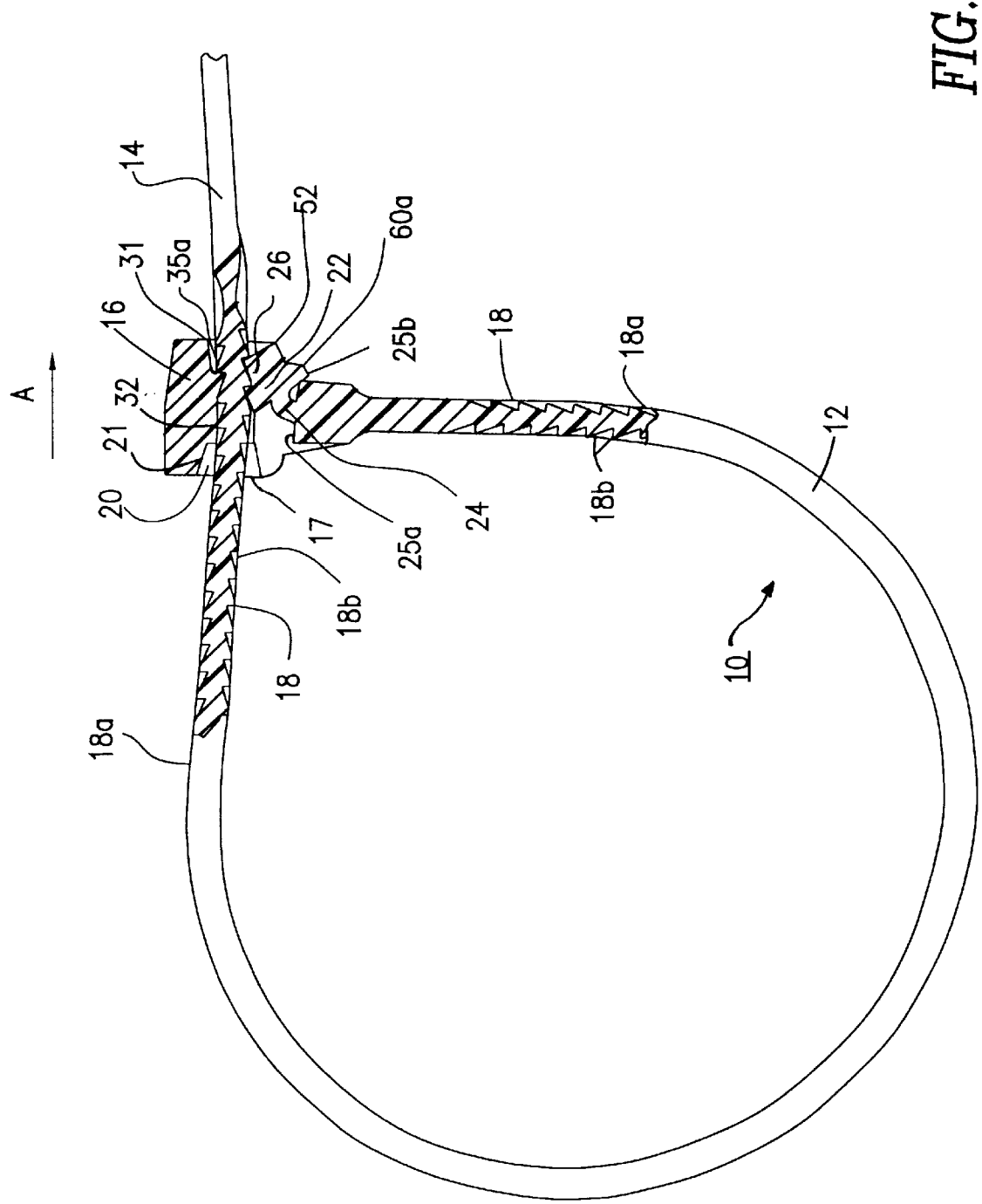
FIG. 5 is a partial cut-away view of the cable tie of FIG. 1 in an assembled configuration.

Referring to FIGS. 1–3, a cable tie 10 of the present invention is shown. Cable tie 10 is of the type referred to as a bi-directional cable tie. Cable tie 10 is generally integrally formed of a suitable molded plastic such as nylon.

Cable tie 10 includes an elongate cable tie strap body 12 terminating at one end in a cable tie tail 14 at the other end and a cable tie head 16. Cable tie strap body 12 is generally a planar member having a plurality of notches or teeth 18 extending along each of opposed planar surfaces 18*a* and 18*b* thereof. As will described in further detail hereinbelow, teeth 18 on each surface 18*a* and 18*b* are staggered with respect to one another. Thus, the raised ridges 40 of teeth 18 on surface 18*a* are non-aligned with the raised ridges of 40 of teeth 18 on surface 18*b*. By staggering the teeth in such a manner, the respective depressions 42 between teeth are not aligned. This avoids the cable tie strap body having a thinned or narrowed cross-sectional thicknesses along the length thereof. Such a construction improves the radial hoop strength of the cable tie in use and reduces incidences of failure from breakage.

Cable tie head 16 defines a first aperture 17, a second aperture 19, and an elongate passageway 20 extending therebetween for insertably accommodating the cable tie tail 14 therethrough. As shown in FIG. 5, cable tie tail 14 is inserted generally in the direction of arrow A, however it may be appreciated due to the symmetrical configuration of cable tie 10, cable tie tail 14 may also be inserted in the direction opposite arrow A.

With additional reference to FIGS. 4 and 5, cable tie head 16 includes a shoulder 25 and a block surface 21 extending along passageway 20 in facing opposition. Head 16 further includes an integrally-formed pawl 22 extending into aperture 20. Pawl 22 is a symmetrical structure extending from a central hinge 24 integrally formed with strap body 12. Pawl 22 includes a locking element 26 and an elongate pawl base 48 which are symmetrically constructed having a pair of pawl teeth 50, 52 and cantilever arms 54, 56 on each side thereof. First pawl tooth 50 includes first and second pawl tooth surfaces 50a, 50b facing first aperture 17 and block surface 21, respectively. Similarly, second pawl tooth 52 includes first and second pawl tooth surfaces 52a, 52b facing second aperture 19 and block surface 21, respectively. Cantilever arm 54 extends towards first aperture 17 and terminates at a first free end 54a. Cantilever arm 56 extends towards second aperture 19 and terminates at a second free end 56a.

Hinge 24 is positioned on and extends from a shoulder 25 of strap body 12. Hinge 24 defines the closed ends of a first notch 60, opening towards first aperture 17, and a second notch 62, opening towards second aperture 19. Shoulder 25 forms a first rotation-stop surface 25a across first notch 60 from cantilever arm 54 and a second rotation-stop surface 25b across second notch 62 from second cantilever arm 56. Stop surfaces 25a and 25b limit the rotation of pawl 22 due to strap insertion through passageway 20, thereby maintaining pawl 22 in ratchet engagement with strap body teeth 18. Cantilever arms 54, 56 are designed so that upon rotation of locking element 26, the free end 54a, 56a of the arm 54, 56 not engaging the strap body 12 extends over and against its underlying rotation stop surface 25a, 25b to thereby close its respective notch 60,62. Such construction permits the strap body 12 to be easily inserted through aperture 20.

For example, upon insertion of cable tie tail 14 into aperture 17, pawl tooth 50 and cantilever arm 54 engage strap body teeth 18 on one planar surface 18a of strap body 12. Locking element 26 is deflectable about hinge 24 to permit continued insertion of strap body 12 through passageway 20. Pawl tooth 50 and cantilever arm 54 are each engageable with strap body teeth 18 on surface 18a so as to provide ratcheting interlocking engagement therewith. Such ratcheting interlocking engagement permits the strap to be continually inserted in the direction of arrow A yet prevents withdrawal of strap body 12 from head 16 in the direction opposite arrow A. Upon attempted withdrawal, pawl tooth 50 and cantilever arm 54 urge strap body 12 against upper wall 21 due to the counter rotation and translation of pawl 22 about and across hinge 24 and stop surface 25b.

A further improvement in the cable tie of the present invention is shown in FIGS. 4 and 5. Cable tie 10 further includes a modification to the upper wall 21. In the present illustrative embodiment upper wall 21 includes inwardly tapered entry surfaces 31 adjacent apertures 17 and 19 of head 16. Tapered surfaces 31 facilitate ease of insertion of cable tie tail 14 into passageway 20. Furthermore, upper wall 21 includes a centrally disposed inwardly directed wall portion 32 extending towards pawl 22. Wall portion 32 is an elongate member which projects downwardly from wall 21 to reduce the opening within passageway 20. This assures engagement between ratchet teeth 18 of strap body 12 and locking element 26 upon insertion of strap body 12 into passageway 20.

In addition, wall portion 32 further includes at each end thereof, a tapered projection 35 which extends further downwardly into passageway 20. Projections 35 straddle each side of pawl 22. Upon insertion of strap body 12 into passageway 20, the teeth 18 on surface 18a are engageable with the projection 35a positioned adjacent the exit end of passageway 20. Deflection of pawl 22 permits continued insertion of strap body 12 in the direction of arrow A. Upon an attempt to withdraw strap body 12 in a direction opposite arrow A, teeth 18 on surface 18a become interlocked with projection 35a further preventing withdrawal of strap body 12 from passageway 20. As may be appreciated, projection 35b operates in the same manner when tail 14 is inserted into passageway 20 in a direction opposite arrow A.

Such construction of head 16 as is shown herein results in a cable tie 10 being resistant to higher withdrawal forces without significantly increasing the force required to insert the tail into passageway 20.

Referring now to FIGS. 6–9, cable tie 110, an alternate embodiment of the present invention, is shown. Similar numbering relates to similar components previously described. Cable tie 110 is a bi-directional cable tie having improved features which provide for enhanced resistance to withdrawal forces in one direction. The operation of pawl 122 and its locking engagement with strap body 112 is generally as previously described. Cable tie 110 is generally integrally formed of a suitable molded plastic such as nylon. Cable tie 110 includes an elongate cable tie strap body 112 including at one end a cable tie tail 114 and at the other end at a cable tie head 116.

Figure 9:
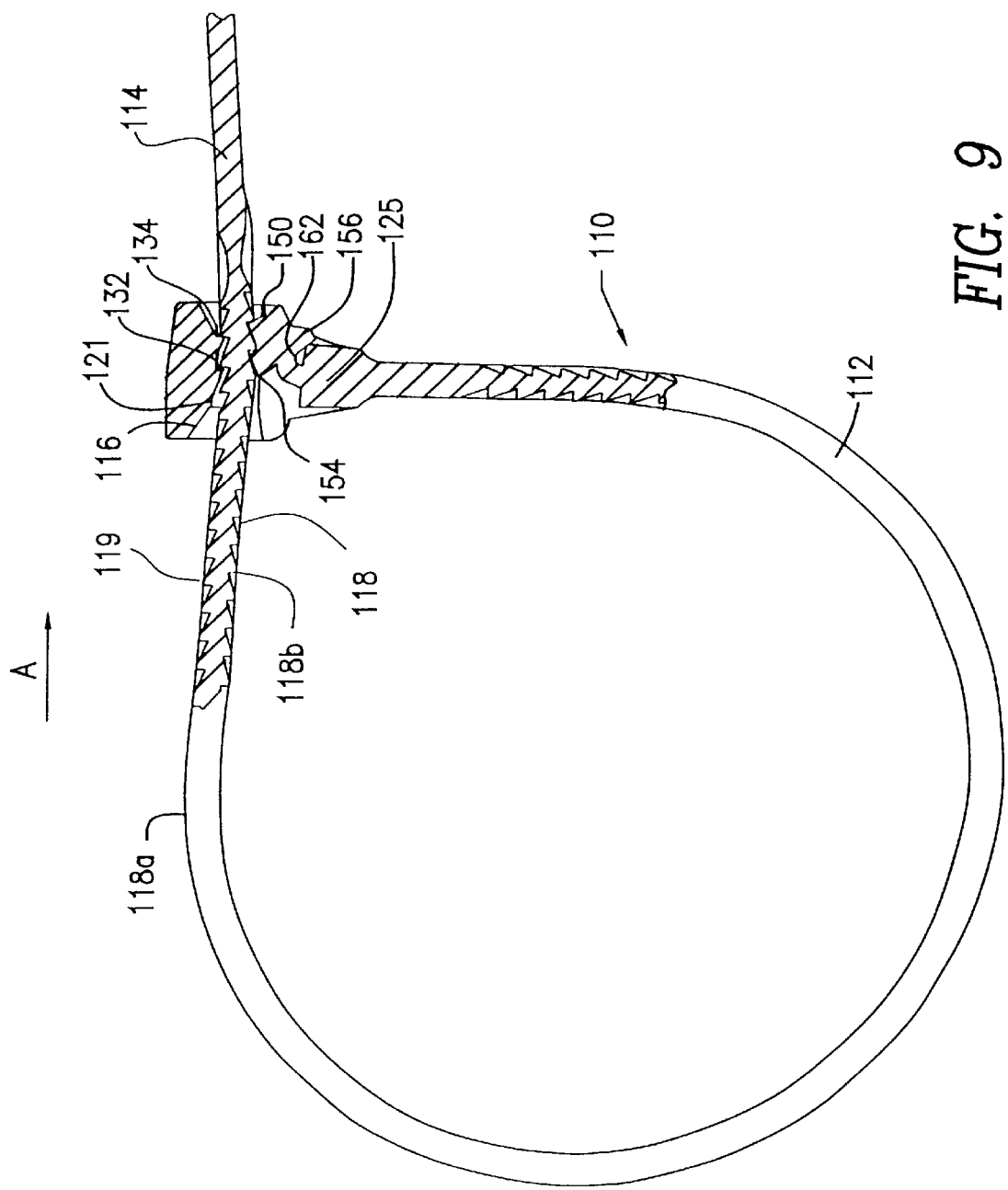
FIG. 9 is a partial cut-away view of the cable tie of FIG. 6 in an assembled configuration.

Cable tie 110 includes an elongate cable tie strap body 112 terminating at one end in a cable tie tail 114 at the other end and a cable tie head 116. Cable tie strap body 112 is generally planar having a plurality of notches or teeth 118 extending in staggered relationship along each opposed planar surface 118a and 118b thereof. Cable tie head 116 defines a first aperture 117, a second aperture 119, and an elongate passageway 120 extending therebetween for insertably accommodating the cable tie tail 114 therethrough. As shown in FIG. 9, cable tie tail 114 is inserted generally in the direction of arrow A, however it may be appreciated due to the symmetrical configuration of cable tie 110, cable tie tail 114 may also be inserted in the direction opposite arrow A.

Figure 8:
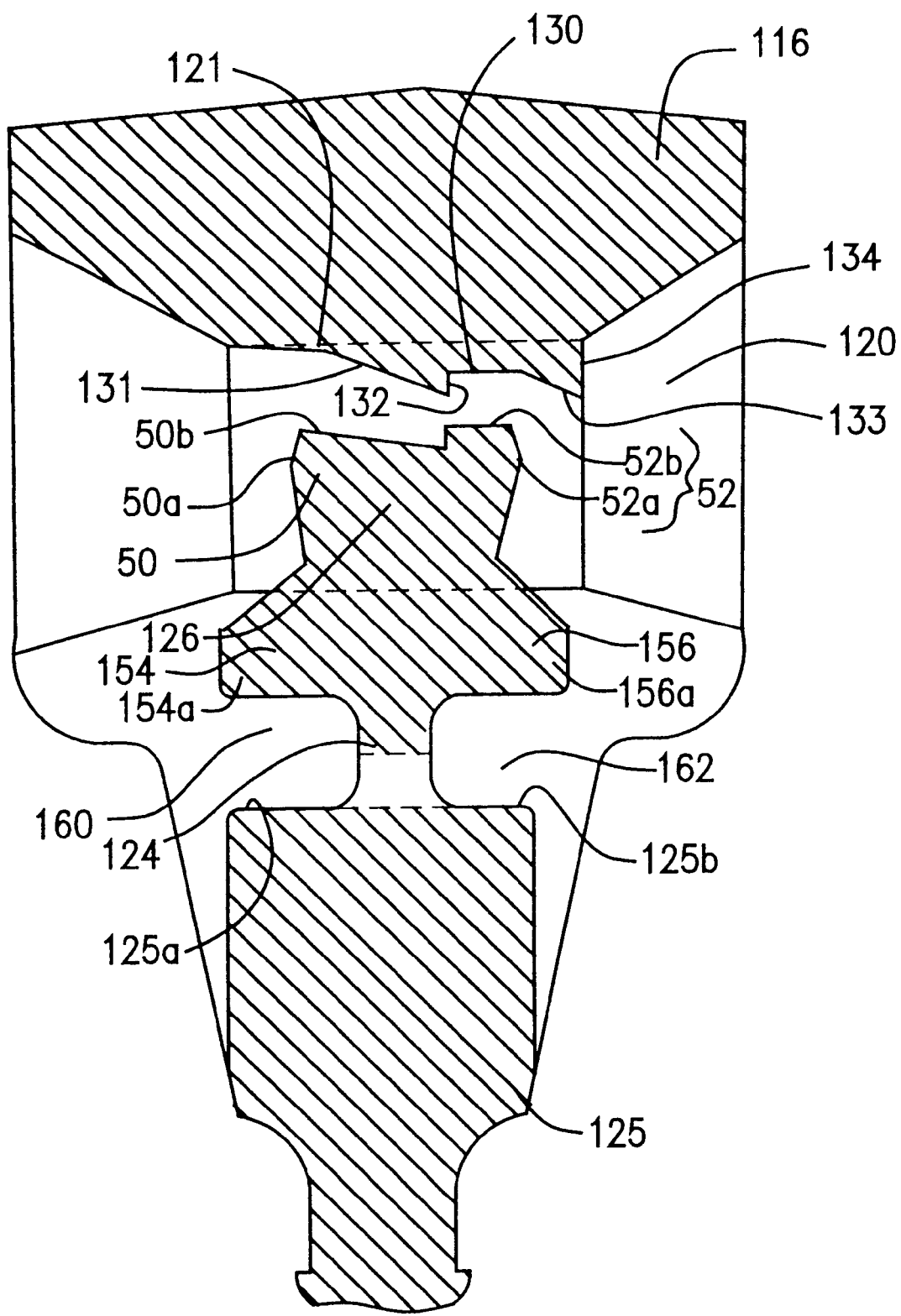
FIG. 8 is a cross-sectional view detailing the deflectable pawl of the cable tie of FIG. 6.

With additional reference to FIGS. 7 and 8, cable tie head 116 includes a shoulder 125 and a block surface 121 extending along passageway 120 in facing opposition. Head 116 further includes an integrally-formed pawl 122 extending into passageway 120. Pawl 122 is a symmetrical structure extending from a central hinge 124 integrally formed with strap body 112. Pawl 122 includes a locking element 126 and an elongate pawl base 148 which are symmetrically constructed having a pair of pawl teeth 150, 152 and cantilever arms 154, 156 on each side thereof. First pawl tooth 150 includes first and second pawl tooth surfaces 150a, 150b facing first aperture 117 and block surface 121, respectively. Similarly, second pawl tooth 152 includes first and second pawl tooth surfaces 152a, 152b facing second aperture 119 and block surface 121, respectively. While first and second pawl teeth 150 and 152 are shown having a dissimilar size and shape, it is contemplated that need they may similarly formed as shown for cable tie 10. Cantilever arm 154 extends towards first aperture 117 and terminates at a first free end 514a. Cantilever arm 156 extends towards second aperture 119 and terminates at a second free end 156a.

Hinge 124 is positioned on and extends from a shoulder 125 of strap body 112. Hinge 124 defines the closed ends of a first notch 160, opening towards first aperture 117, and a second notch 162, opening towards second aperture 119. Shoulder 125 forms a first rotation-stop surface 125a across first notch 160 from cantilever arm 154 and a second rotation-stop surface 125b across second notch 162 from second cantilever arm 156. Stop surfaces 125a and 125b limit the rotation of pawl 122 due to strap insertion through passageway 120, thereby maintaining pawl 122 in ratchet engagement with strap body teeth 118. Cantilever arms 154, 156 are designed so that upon rotation of locking element 126, the free end 154a, 156a of the arm 154, 156 not engaging the strap body 112 extends over and against its opposite rotation stop surface 125a, 125b to thereby close its respective notch 160, 162. Such construction permits the strap body 112 to be easily inserted through passageway 120.

In order to improve the locking capability of the cable tie of the present invention and in order to enhance the prevention of withdrawal of the strap body in a direction opposite the direction of insertion, the present invention configures upper wall 121 as shown in FIGS. 6–9. Upper wall 121 includes a non-symmetrical surface 130 having a pair of generally ramped or angled surfaces 131 and 133 which extend into passageway 120 and are asymmetrical to one side of the aperture. The end of ramped surfaces 131 and 133 forms spaced apart ledges 132 and 134 which define locking notches for engagement with the teeth of strap body 112.

As particularly shown in FIG. 9, strap body 112 may be inserted in the direction of arrow A. The dual tapered or ramped configuration of surface 130 helps guide strap body 112 through passageway 120 in such a direction. Upon such insertion of strap body 112 into passageway 120, pawl 122 is deflected. Continued insertion of strap body 112 into passageway 120 is permitted by the particular configuration of ramped surface 131. Upon an attempt to withdraw strap body 112 from passageway 120 in a direction opposite arrow A, locking element 126 engages strap body teeth 118 on surface 118b in a manner described hereinabove. However, the particular configuration of surface 130 further resists the withdrawal forces as ledges 132 and 134 also engage successive ridges 140 of teeth 118 on the opposed surface 118a of strap body 112. The distance which ledges 132 and 134 are spaced apart on surface 130 is approximately equivalent to the pitch or spacing between teeth 118 on surface 118a of strap body 112. Such dual locking capability on both sides of strap body 112 helps retain strap 112 in a locked configuration within passageway 120 against withdrawal forces. Thus, the cable tie shown in FIG. 8 is particularly resistant to withdrawal forces applied in a direction opposite arrow A of the insertion direction.

However, it may be appreciated that while the particular construction shown herein allows easy insertion of the strap body into passageway 120 in the direction of arrow A and prevents withdrawal of the strap body in the direction opposite arrow A due in part to the improved configuration of surface 130, the cable tie shown herein may be used in conventional symmetrical fashion, i.e., the cable tie may still be employed with the insertion direction being the direction opposite arrow A and a withdrawal direction being in the direction of arrow A. Thus, the present invention while providing a symmetrical structure where the body may be locked in the head aperture in either direction provides superior performance characteristics when used in a manner shown in FIG. 9.

Figure 10:
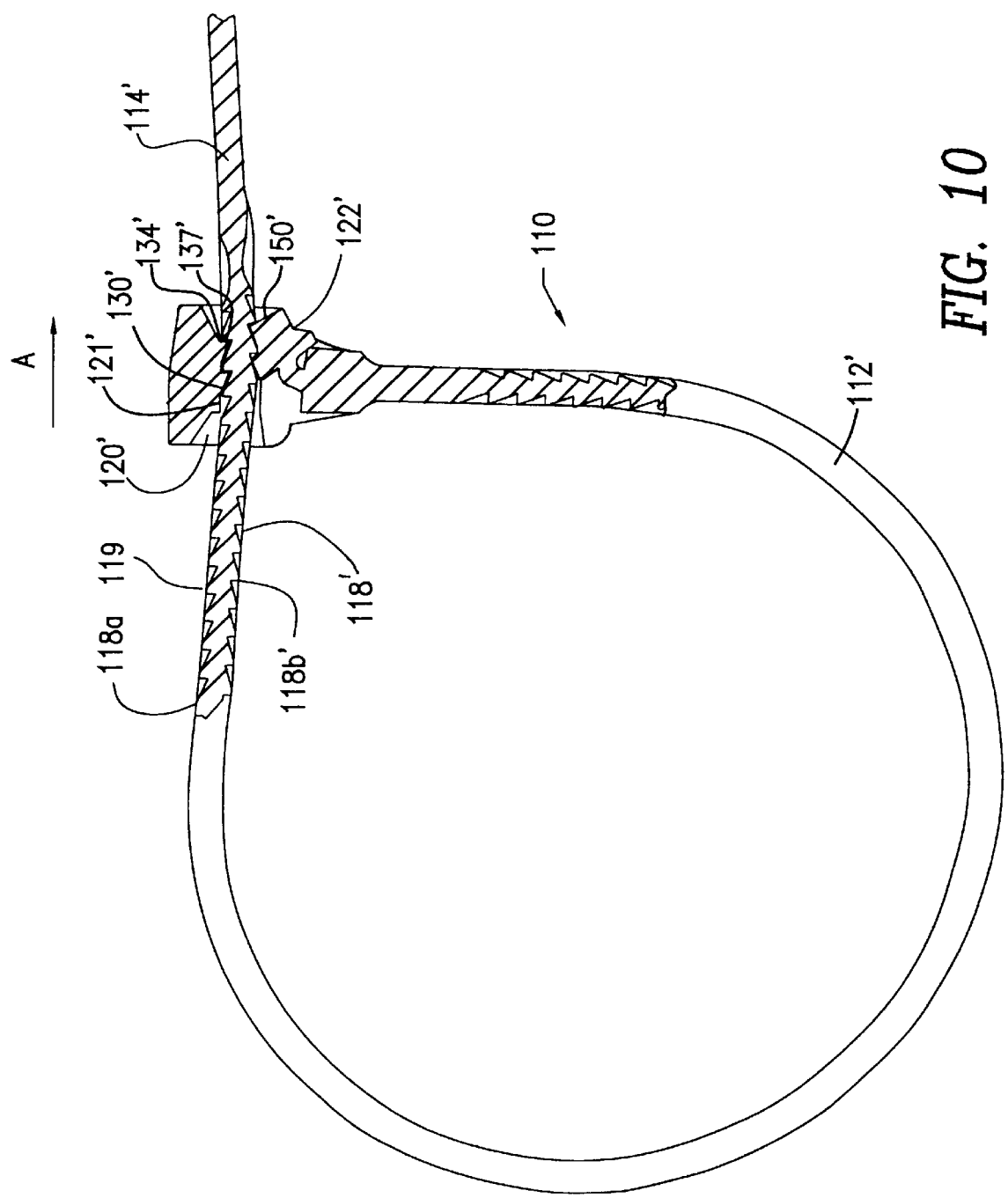
FIG. 10 is a partial cut-away view of an alternate embodiment of the cable tie of FIG. 6 in which the head include a single fixed locking tooth in facing opposition to the pawl.
Figure 11:
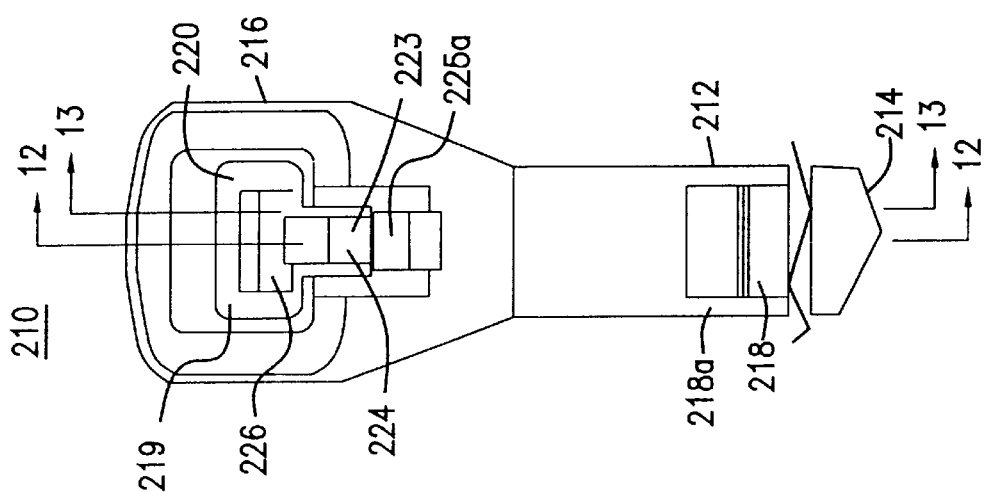
FIG. 11 is a front elevational view of an alternate embodiment of the cable tie head and deflectable pawl of the cable tie of the present invention.

Referring to FIG. 10, cable tie 110' is shown. Cable tie 110' substantially similar to cable tie 110 shown in FIG. 7 with each element being substantially identical and operating in a substantially identical manner. However, cable tie 110' includes a further embodiment of upper wall 121' wherein surface 130' includes a single ramped surface 134' extending into and towards one side of passageway 120'. The ramped surface 134' forms a downwardly extending ledge 137' within passageway 120. Thus, upon an attempt to withdraw strap body 112' from passageway 120' ledge 137' engages one of the ridges 140' of teeth 118' on surface 118a' so as to provide further redundant locking engagement therewith. As with the embodiment described above, the present embodiment, enhances the resistance to withdrawal forces of the cable tie where the strap body is attempted to be withdrawn in a direction opposite arrow A. However, as with the embodiment shown in FIG. 6, the cable tie 110' functions in a symmetrical manner by allowing strap body 112 to be inserted in head aperture in either direction.

Referring now to FIGS. 11–15, cable tie 210, a further embodiment of the present invention, is shown. Similar numbering relates to similar components previously described. Cable tie 210 is a bi-directional cable tie having features which provide for enhanced resistance to withdrawal forces by facilitating the pawl wedging the strap body against the block surface. The operation of pawl 222 and its locking engagement with strap body 212 is generally as previously described. Cable tie 210 is generally integrally formed of a suitable molded plastic such as nylon.

Figure 15:
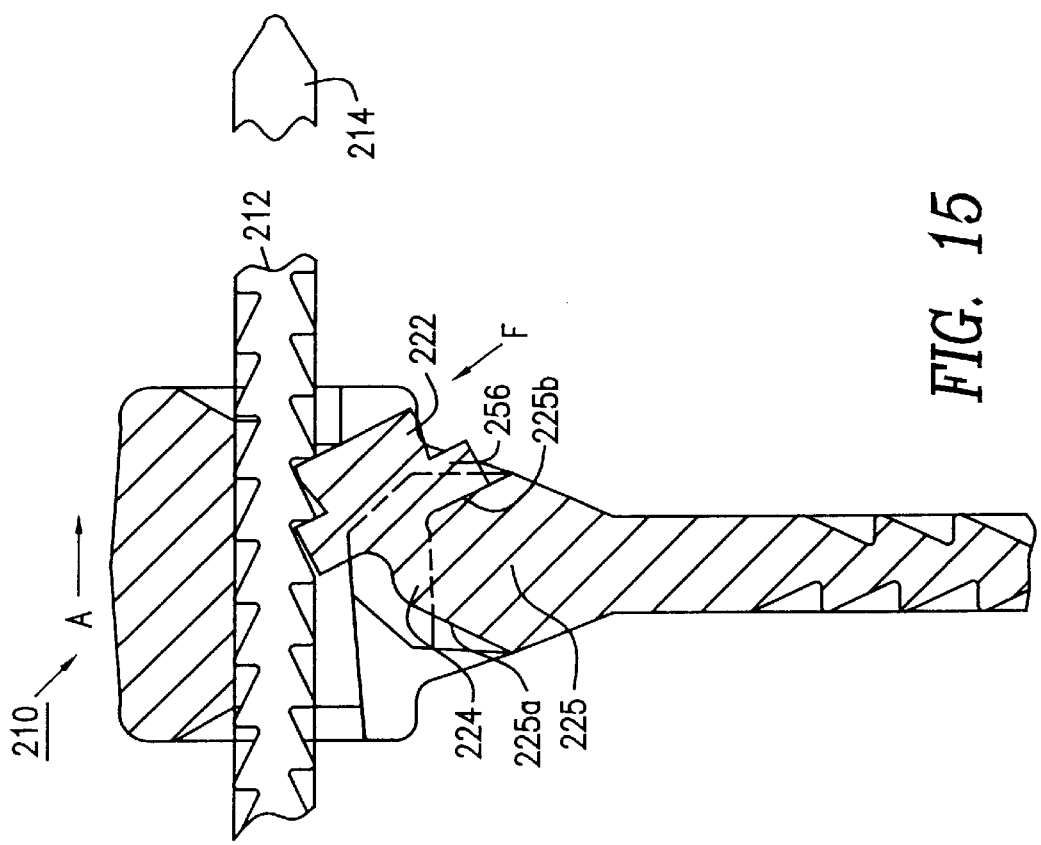
FIG. 15 is a cross-sectional view of the cable tie head of FIG. 11 in an assembled configuration.
Figure 14:
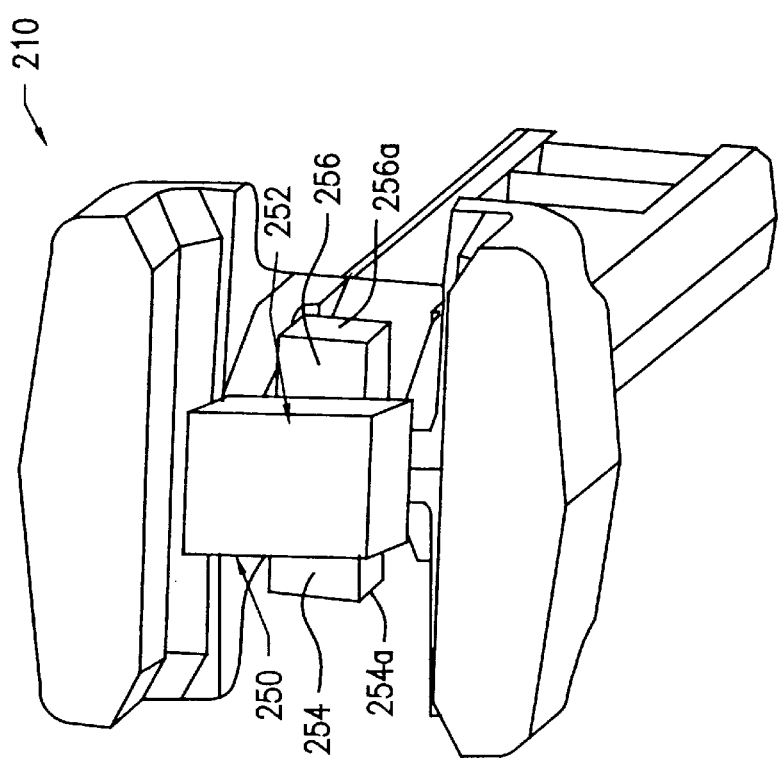
FIG. 14 is a perspective cross-sectional view of the cable tie head taken through line 14—14 in FIG. 11.
Figure 16:
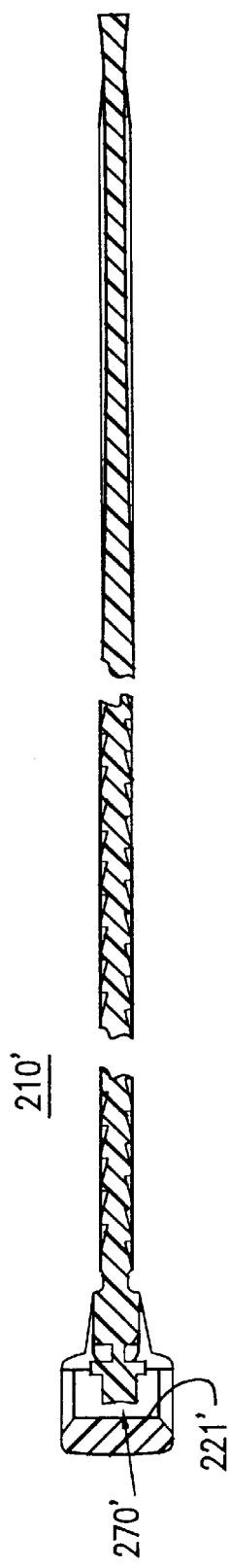
FIG. 16 is a cross-sectional view of still another embodiment of the cable tie of the present invention providing undercut strap engaging surfaces on the locking teeth of the deflectable pawl.
Figure 18:
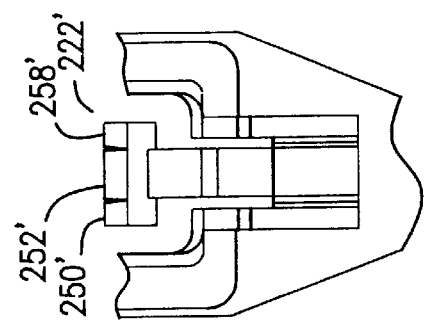
FIG. 18 is a front elevational view of the locking pawl of the cable tie of FIG. 16.
Figure 17:
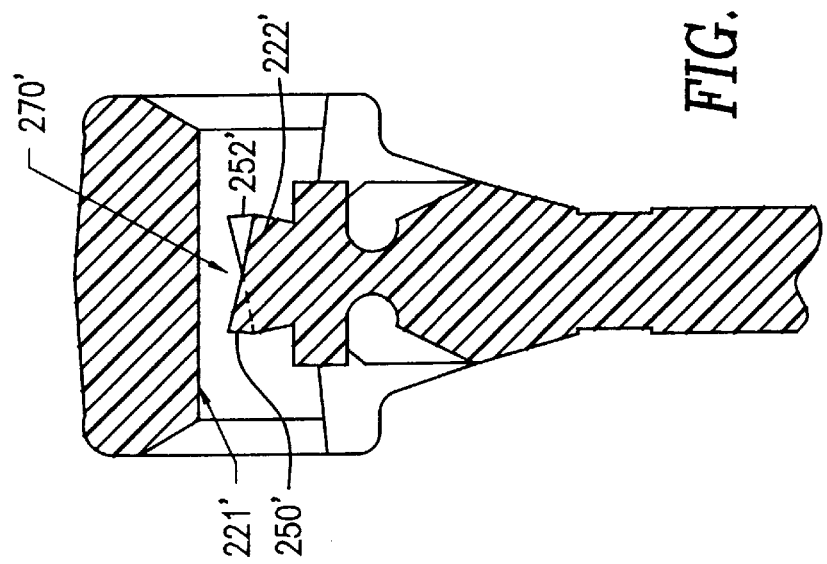
FIG. 17 is a cross-sectional view detailing the deflectable pawl of the cable tie of FIG. 16.
Figure 19:
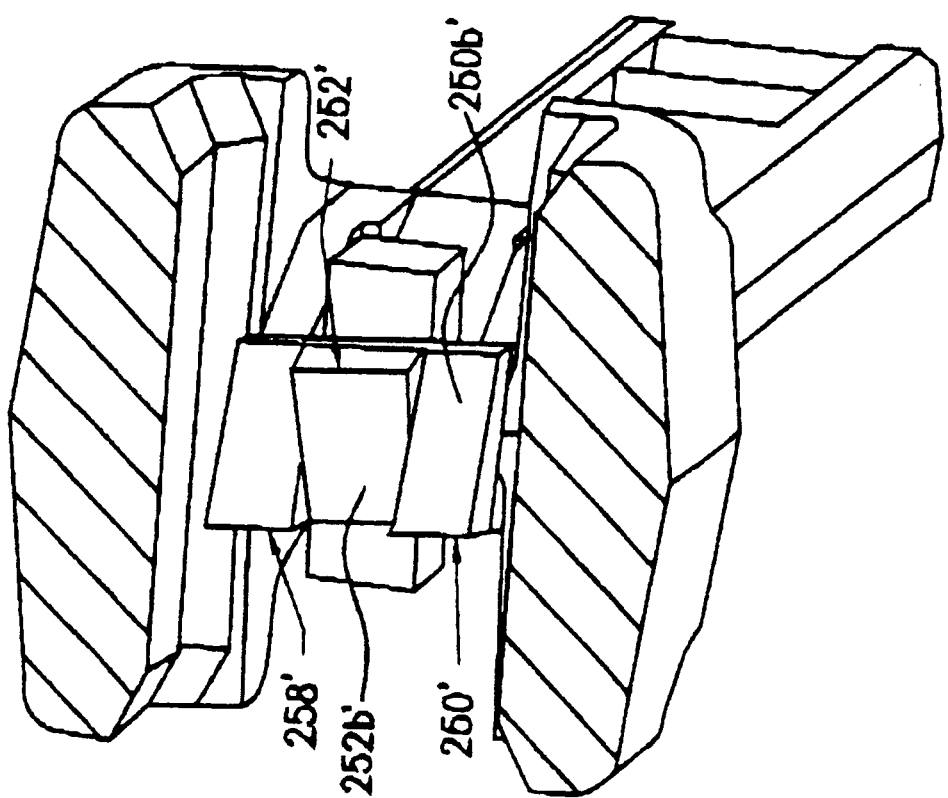
FIG. 19 is a perspective cross-sectional view of the head of the cable tie of FIG. 16 detailing the locking teeth of the deflectable pawl.

Cable tie 210 includes an elongate cable tie strap body 212 terminating at one end in a cable tie tail 214 at the other end and a cable tie head 216. Cable tie strap body 212 is generally planar having a plurality of notches or teeth 218 extending in staggered relationship along each opposed planar surface 218a and 218b thereof. Cable tie head 216 defines a first aperture 217, a second aperture 219, and an elongate passageway 220 extending therebetween for insertably accommodating the cable tie tail 214 therethrough. As shown in FIG. 15, cable tie tail 214 is inserted generally in the direction of arrow A, however it may be appreciated due to the symmetrical configuration of cable tie 210, cable tie tail 214 may also be inserted in the direction opposite arrow A.

Figure 12:
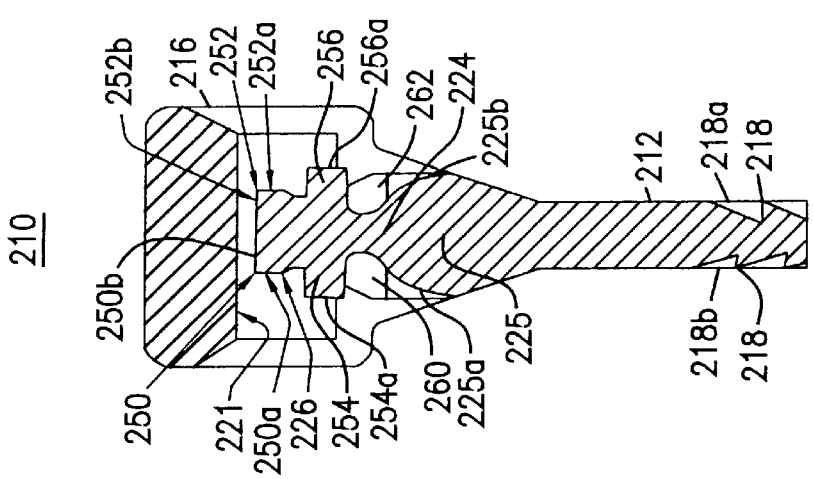
FIG. 12 is a cross-sectional view of the cable tie head and deflectable pawl taken through the line 12—12 in FIG. 11.
Figure 13:
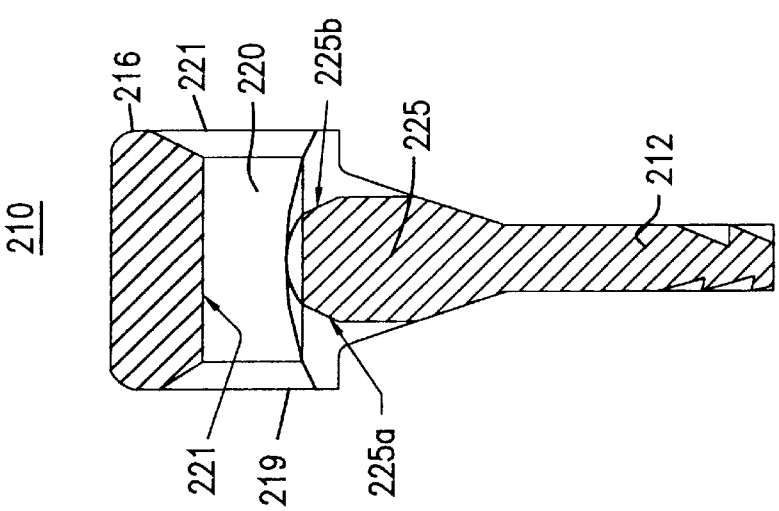
FIG. 13 is a cross-sectional view of the passageway through the cable tie head taken though the line 13—13 in FIG. 11.

With additional reference to FIGS. 12 and 15, cable tie head 216 includes a shoulder 225 and a block surface 221 extending along passageway 220 in facing opposition. Head 216 further includes an integrally-formed pawl 222 extending into passageway 220. Pawl 222 is a symmetrical structure extending from a central hinge 224 integrally formed with strap body 212. Pawl 222 includes a locking element 226 and an elongate pawl base 248 which are symmetrically constructed having a pair of pawl teeth 250, 252 and cantilever arms 254, 256 on each side thereof. First pawl tooth 250 includes first and second pawl tooth surfaces 250a, 250b facing first aperture 217 and block surface 221, respectively. Similarly, second pawl tooth 252 includes first and second pawl tooth surfaces 252a, 252b facing second aperture 219 and block surface 221, respectively. Cantilever arm 254 extends towards first aperture 217 and terminates at a first free end 254a. Cantilever arm 256 extends towards second aperture 219 and terminates at a second free end 256a.

Hinge 224 is positioned on and extends from a shoulder 225 of strap body 212. Hinge 224 defines the closed ends of a first notch 260, opening towards first aperture 217, and a second notch 262, opening towards second aperture 219. Shoulder 225 forms a first rotation-stop surface 225a across first notch 260 from cantilever arm 254 and a second rotation-stop surface 225b across second notch 262 from second cantilever arm 256. Stop surfaces 225a and 225b are formed having a pronounced taper so that stop surface 225a faces both first aperture 217 and block surface 221 while stop surface 225b faces both second aperture 219 and block surface 221. Stop surfaces 225a and 225b limit the rotation of pawl 222 due to strap insertion and also provide a surface for facilitating the wedging of pawl 222 between shoulder 225 and strap body 212 so as to further compress strap body 212 against block surface 221. Cantilever arms 254, 256 are designed so that upon rotation of locking element 226, the free end 254a, 256a of the arm 254, 256 not engaging the strap body 212 extends over and against its opposite rotation stop surface 225a, 225b to thereby close its respective notch 260, 262. Upon the attempted withdrawal of strap body 212, pawl 222 is pulled along the stop surface of the closed notch towards the strap body and thus enhances the resistance to strap withdrawal. The resultant force F acting on pawl 222 is shown in FIG. 15 to be acting generally along the engaged stop surface.

Referring now to FIGS. 16–19, cable tie 210', yet still another embodiment of the present invention, is shown. Similar numbering relates to similar components previously described. Cable tie 210' is a bi-directional cable tie exhibiting enhanced resistance to withdrawal forces by providing an undercut to the locking teeth on the pawl for engaging the locking teeth of the strap body. The operation of pawl 222' and its locking engagement with strap body 212' is generally as previously described. Cable tie 210' is generally integrally formed of a suitable molded plastic such as nylon.

Locking pawl 222' of cable tie 210' provides a chevron-shaped top surface 270' in undeflected facing opposition to blocking surface 221'. The chevron-shape of top surface 270' provides an undercut to the tooth engaging surfaces 250b' and 252b' of locking teeth 250' and 252', respectively, for increasing the locking effectiveness of locking pawl 222'. In this embodiment, tooth engaging surfaces 250b' and 252b' face both blocking surface 221' and apertures 217' and 219', respectively. The chevron-shape of top surface 270' is desirably formed by transversely-spacing locking teeth 250 and 252 across passageway 220' as shown in FIGS. 16–19 so that the tooth engaging surfaces 250b' and 252b' have uninhibited exposure to apertures 217' and 219', respectively. Furthermore, the present invention contemplates providing a third locking tooth 258' having a similar size, shape, and orientation as locking tooth 250' for providing transversely-uniform resistance forces against strap body 212'. Desirably, the transverse dimension of locking teeth 250' and 258' are about the same as that of locking tooth 252'.

While the preferred embodiment of the present invention has been shown and described, it will be obvious in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An elongate bi-directional one-piece cable tie comprising:
    a locking head at one end, a tail at the other end and an elongate strap body therebetween;
    said strap body having opposing first and second major surfaces including a plurality of locking teeth formed on each said surface;
    wherein said locking head includes
        a perimetrical wall defining a first aperture, a second aperture, and an elongate strap passageway extending therebetween in a direction substantially perpendicular to said strap body;
        a shoulder surface and a block surface opposing said shoulder surface extending along said passageway, said shoulder surface providing a first rotation stop adjacent said first aperture and a second rotation surface adjacent said second aperture; and
        a deflectable locking pawl extending into said passageway across from said block surface, said locking pawl being substantially aligned with said strap body and further being deflectable by said strap body upon insertion of said strap body through said passageway in a first direction, said locking pawl providing locking engagement with said strap body upon attempted withdrawal of said strap body in a second direction opposite to said first direction;
    wherein said locking pawl further includes:
        a locking portion having a first locking tooth facing said first aperture and said passageway and a second locking tooth facing said second aperture and said passageway;
        an elongate pawl base including a first cantilever arm having a first free end extending towards said first aperture and a second cantilever arm having a second free end extending towards said second aperture;
    said locking pawl being connected to said shoulder by a flexible hinge defining the closed end of both a first notch bounded by said first cantilever arm and said shoulder and opening towards said first aperture, and a second notch bounded by said second cantilever arm and said shoulder and opening towards said second aperture;
    wherein insertion of said strap body through said first aperture into said passageway past said locking pawl causes said locking pawl to translate and rotate about said flexible hinge towards said second aperture so that said second free end of said second cantilever arm engages said second rotation stop of said shoulder to close said second notch, and wherein attempted withdrawal of said strap body back through said passageway causes said first locking tooth of said pawl to engage a locking tooth of said strap body and counter-rotate said locking pawl about said hinge and said second end of said second cantilever arm to thereby force said strap body against said block surface of said head; and
    wherein insertion of said strap body through said second aperture into said passageway past said locking pawl causes said locking pawl to translate and rotate about said flexible hinge towards said first aperture so that said first free end of said first cantilever arm engages said first rotation stop of said shoulder to close said first notch, and wherein attempted withdrawal of said strap body back through said passageway causes said second locking tooth of said pawl to engage a locking tooth of said strap body and counter-rotate said locking pawl about said hinge and said first free end of said first cantilever arm to thereby force said strap body against said block surface of said head.

2. The cable tie of claim 1, wherein said block surface includes a first fixed locking tooth formed to engage the locking teeth on the strap body.

3. The cable tie of claim 2, wherein said block surface includes a second fixed locking tooth for engaging the locking teeth on the strap body.

4. The cable tie of claim 3 wherein said first and second locking teeth of said locking pawl are dissimilarly sized and shaped so as to provide distinct hoop strengths depending on the insertion direction of said strap body.

5. The cable tie of claim 3 wherein said first and second fixed locking teeth on said block surface provide engagement surfaces facing opposite apertures of said head so that each fixed locking tooth resists withdrawal of said strap body towards the other fixed locking tooth.

6. The cable tie of claim 1, wherein each of said first and second stop surfaces are tapered to face towards said passageway and its respective notch opening to thereby provide a ramp surface along which said pawl base may slide towards said strap body upon attempted withdrawal of said strap body.

7. The cable tie of claim 1, wherein said locking pawl provides a chevron-shaped surface in undeflected facing opposition to said block surface.

8. The cable tie of claim 7, wherein said chevron-shaped surface is formed by said first and second locking teeth of said locking portion being transversely-spaced with respect to each other across said passageway.

9. The cable tie of claim 8, wherein said locking portion includes a third locking tooth having a similar size and shape as, and transversely spaced across said second locking tooth from, said first locking tooth.

10. The cable tie of claim 1, wherein said locking teeth on said first major surface of said strap body are longitudinally staggered with respect to said locking teeth on said second major surface of said body.

* * * * *